United States Patent [19]

Katagiri et al.

[11] Patent Number: 5,708,049
[45] Date of Patent: Jan. 13, 1998

[54] COLORED CONTACT LENS AND METHOD FOR PRODUCING THE SAME

[75] Inventors: Hiroshi Katagiri; Tadao Kojima; Youichi Ushiyama, all of Suwa, Japan

[73] Assignee: Seiko Epson Corporation, Tokyo-to, Japan

[21] Appl. No.: 597,811

[22] Filed: Feb. 7, 1996

[30] Foreign Application Priority Data

Feb. 7, 1995 [JP] Japan .................. 7-019194
Apr. 20, 1995 [JP] Japan .................. 7-095710
Jan. 22, 1996 [JP] Japan .................. 8-008693

[51] Int. Cl.$^6$ .................................................. G02C 7/04
[52] U.S. Cl. .................... 523/106; 351/162; 526/284; 526/310; 526/240; 526/241; 524/547
[58] Field of Search .................... 523/106; 351/162; 526/284, 310, 240, 241; 524/547

[56] References Cited

U.S. PATENT DOCUMENTS

| | | | |
|---|---|---|---|
| 4,252,421 | 2/1981 | Foley, Jr. ..................... | 351/162 |
| 5,030,669 | 7/1991 | Hendrickson et al. ........ | 523/106 |
| 5,187,012 | 2/1993 | Takahashi et al. ............ | 524/579 |

FOREIGN PATENT DOCUMENTS

| | | |
|---|---|---|
| 209879 | 1/1987 | European Pat. Off. . |
| 49-6939 | 1/1974 | Japan . |
| 53-2692 | 1/1978 | Japan . |
| 58-46319 | 3/1983 | Japan . |
| 59-39553 | 9/1984 | Japan . |
| 471431 | 11/1987 | Japan . |
| 62-265357 | 11/1987 | Japan . |
| 63-50581 | 3/1988 | Japan . |
| 1280464 | 11/1989 | Japan . |
| 5194616 | 8/1993 | Japan . |
| 1167162 | 10/1969 | United Kingdom . |

OTHER PUBLICATIONS

Patent Abstracts of Japan for Patent Publication #62265357 of Nov. 1987.
Patent Abstracts of Japan for Patent Publication #05194616 of Aug. 1993.
Horiguchi "Color Material (Shiki–zai)" vol. 38, No. 3 (1964) pp. 100–108; JP 667.622.32–127.

Primary Examiner—Andrew E. C. Merriam
Attorney, Agent, or Firm—Ladas & Parry

[57] ABSTRACT

A contact lens colored with a poly(meth)acrylate-combined metallophthalocyanine compound represented by the following formula (I):

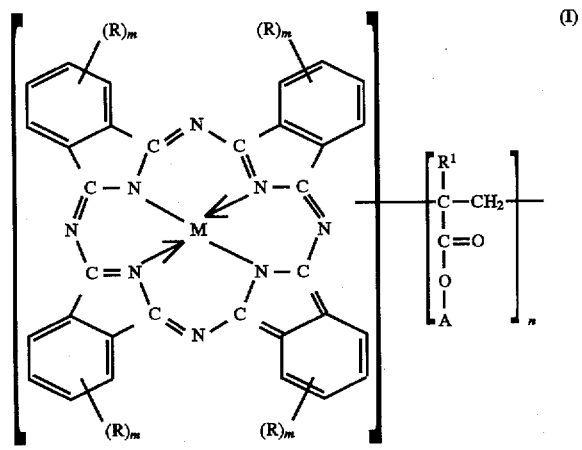

wherein M represents a metal atom to which phthalocyanine can coordinate, R represents a halogen atom, m is an integer of 0 to 4, $R^1$ represents a hydrogen atom or a methyl group, and A represents a hydrogen atom, a $C_{1-12}$ alkyl group, a hydroxy$C_{1-12}$alkyl group or a glycerol group. The colored contact lens has sufficiently high fastness, so that the lens undergoes neither color change nor color fading even when it is sterilized by boiling.

18 Claims, No Drawings

COLORED CONTACT LENS AND METHOD FOR PRODUCING THE SAME

BACKGROUND OF THE INVENTION

1. Field of the Invention

The present invention relates to a colored contact lens, and more specifically to a contact lens, in particular, a soft contact lens, colored with a specific coloring agent.

2. Background Art

Colored contact lenses are advantageous in that it is easy to know whether they are in a lens case or not and to discriminate a lens from the others, and that missing one can be easily found out. Moreover, they are useful to protect eyes from strong ultraviolet rays or to protect a person from being dazzled under direct sunshine. Further, this may improve the image of contact lenses. A contact lens is brought into contact with the cornea upon use. It is therefore required that coloring agents which are used to color contact lenses be safe and never or hardly elute from the colored contact lenses. Further, contact lenses are used under an aqueous environment. In particular, soft contact lenses are always used in a state of water-containing gel swollen with water. Furthermore, contact lenses are needed to be sterilized by boiling or the like. For this reason, coloring agents which are used to color contact lenses are required to have high dyeability so that they will not elute from the colored contact lenses when the lenses are swollen with water or subjected to boiling treatment. In particular, those coloring agents which are used to color high-water-content soft contact lenses containing 50% by weight or more of water are required to have higher dyeability.

There have been known as techniques for coloring contact lenses (1) "dyeing before polymerization" in which a polymerizable monomer in a liquid state is colored with a dye or a pigment before the monomer is polymerized, and (2) "dyeing after polymerization" in which a colorless, transparent contact lens produced in advance molding is subjected to coloring.

The following methods have been known as the technique of "dyeing before polymerization": for example, a method disclosed in Japanese Laid-Open Patent Publication No. 6939/1974 in which after a polymerization reaction system of (meth)acrylate monomer is added with a reactive dye capable of reacting with the monomer, polymerization is conducted to obtain a colored contact lens; a method disclosed in Japanese Laid-Open Patent Publication No. 50581/1988 in which a water-insoluble coloring matter that has been incorporated into a contact lens made of a hydrogel is allowed to precipitate as fine particles by swelling the contact lens with water to obtain a colored soft contact lens; and a method disclosed in Japanese Laid-Open Patent Publication No. 280464/1989 in which a specific polymerizable coloring matter that is soluble in and copolymerizable with vinyl monomers to be used to make lenses for eyes is employed to produce a colored contact lens.

Further, Japanese Patent Publication No. 71431/1992 discloses a colorant comprising a polymerizable copper phthalocyanine derivative having methacryloyl or acryloyl group, to be used with polymerizable materials for, in particular, for contact lenses and intraocular implants.

On the other hand, the following methods have been known as the technique of "dyeing after polymerization": for example, a method disclosed in Japanese Patent Publication No. 2692/1978 in which a coloring layer is printed or coated onto a contact lens to obtain a colored contact lens; a dyeing method using vat dyes, disclosed in Japanese Patent Publication No. 39553/1984, in which after a reduced water-soluble vat dye is infiltrated into a contact lens, the dye is rendered to be insoluble by oxidation treatment to obtain a colored contact lens; and a method disclosed in Japanese Laid-Open Patent Publication No. 46319/1983 in which a reactive dye capable of forming a covalent bond with hydroxyl, amino or amide group contained in a base material of a contact lens is used to obtain a colored contact lens.

By these conventional techniques, colored contact lenses having a certain degree of fastness can be obtained. However, a need still exists for more firmly-colored contact lenses. Further, some of the conventional techniques are disadvantageous in that the production process is complicated because it requires the step of removing an unreacted monomer or coloring component.

Further, there has been no report in terms of the conventional techniques that the strength of a lens itself has been improved by the addition of a coloring component.

SUMMARY OF THE INVENTION

We have now found that a polymer comprising a specific phthalocyanine compound shows excellent properties as a coloring agent for contact lenses, and, at the same time, unexpectedly found that even a small amount of such a polymer can improve the strength of contact lenses.

Accordingly, an object of the present invention is to provide a coloring agent for contact lenses of which dyeability is so high that lenses colored with the coloring agent readily undergo neither color fading nor color change. In particular, it is a coloring agent for contact lenses with which high-water-content soft contact lenses can be firmly colored.

Another object of the present invention is to provide a contact lens colored with the above coloring agent, which does not readily undergo color fading or color change, and a method for producing the same.

A coloring agent for contact lenses according to the present invention comprises a poly(meth)acrylate-combined metallophthalocyanine compound represented by the following formula (I):

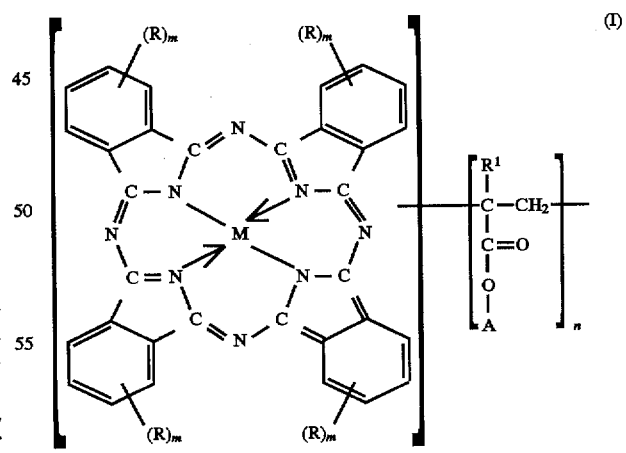

wherein

M represents a metal atom to which phthalocyanine can coordinate,

R represents a halogen atom, m is an integer of 0 to 4, provided that one of Rs in the phthalocyanine group represents a bond with the poly(meth) acrylate moiety, $R^1$ represents a hydrogen atom or a methyl group, and A represents a hydrogen atom, a $C_{1-12}$ alkyl group, a hydroxy$C_{1-12}$alkyl group or a glycerol group.

A colored contact lens according to the present invention is one which is colored with the above-defined coloring agent of the present invention.

DETAILED DESCRIPTION OF THE INVENTION

Compound of Formula (I)

The coloring agent for contact lenses according to the present invention comprises a poly(meth)acrylate-combined metallophthalocyanine compound represented by the formula (I). The poly(meth)acrylate-combined metallophthalocyanine compound has a structure in which a metallophthalocyanine group and a (meth)acrylic acid copolymer moiety (hereinafter may be referred to as a "polymer moiety") are combined with each other.

In the formula (I), M represents a metal to which phthalocyanine can coordinate. Preferable examples of M include copper, cobalt and nickel. A compound (I) containing copper as M is particularly preferred.

Hydrogen atoms in the phthalocyanine group may be substituted with halogen (for example, bromine or chlorine); that is, Rs in the formula (I) may be halogen atoms. In general, when a metallophthalocyanine group is halogenated, the absorption spectrum thereof in the visible region shifts to the short wavelength side. Therefore, compounds of the formula (I) having different colors can be obtained by the substitution with halogen atoms. In particular, chlorinated copper phthalocyanine obtained by chlorinating copper phthalocyanine is preferred because of its vivid green color.

Examples of the (meth)acrylate unit constituting the polymer moiety in the compound of the formula (I) include (meth)acrylic acid when A is a hydrogen atom, an alkyl (meth)acrylate when A is an alkyl group having 1 to 12 carbon atoms, a hydroxyalkyl (meth)acrylate when A is a hydroxyalkyl group having 1 to 12 carbon atoms, and glycerol mono(meth)acrylate when A is a glycerol group. Specific examples of the (meth)acrylate unit preferably include (meth)acrylic acid, methyl (meth)acrylate, ethyl (meth)acrylate, propyl (meth)acrylate, butyl (meth)acrylate, hexyl (meth)acrylate, lauryl (meth)acrylate, 2-hydroxyethyl (meth)acrylate, hydroxybutyl (meth)acrylate, and 2,3-dihydroxypropyl (meth)acrylate. In the present invention, the polymer moiety may be either a homopolymer or a copolymer of the above (meth)acrylate units. When the polymer moiety is a copolymer, its structure may be either random or blocked.

(Meth)acrylate units and the monomeric composition of poly(meth)acrylate may be properly selected with consideration for the type of a starting monomer to be used for producing a contact lens, and the solubility in the starting monomer. For instance, in order to obtain a high-water-content soft contact lens, it is preferable to select a hydrophilic (meth)acrylate.

The molecular weight (polymerization degree) of the polymer moiety of the coloring agent of the invention can be controlled by the reaction conditions, for example, polymerization temperature and time, pH, and addition of a polymerization inhibitor, under which chain reaction of a polymerizable monomer, starting from a metallophthalocyanine, is carried out. In order to prevent the compound of the formula (I) from eluting from a contact lens colored with the compound (I) even when the lens is subjected to boiling treatment or the like, and with consideration for the compatibility of the compound (I) with a starting monomer for a contact lens and the physical properties of the contact lens after polymerization is conducted, it is preferable that the number-average molecular weight of the polymer moiety be from 5,000 to 500,000, preferably from 10,000 to 300,000.

In the present invention, the amount of the compound of the formula (I) to be incorporated into a contact lens may be properly determined within such a range that the effects of the compound can be obtained and that the contact lens is not adversely affected by the compound. The amount of the compound (I) is preferably about 0.001 to 2%, more preferably about 0.01 to 0.5% of the dry weight of a contact lens.

A contact lens incorporated with the compound of the formula (I) is firmly colored. When the contact lens is not only a hard one but also a soft one which is needed to be sterilized by boiling or chemicals, the color of the lens is hardly faded or changed for a long period of time. Even a high-water-content soft contact lens (the water content thereof being, for instance, 45% or higher, more preferably 50% or higher) colored with the compound (I) does not easily undergo color fading or color change when it is sterilized by boiling or chemicals. According to a preferred embodiment of the present invention, a high-water-content soft contact lens colored with the compound of the formula (I) hardly undergoes color fading or color change even when it is continuously boiled for 200 hours (corresponding to approximately 800 times of sterilization by boiling according to a simple calculation).

Further, it was unexpectedly found that even a small amount of the compound of the formula (I) can improve the optical properties and mechanical strength of a contact lens. According to a preferred embodiment of the present invention, it can be expected that the average breaking strength and the average elongation of a contact lens be improved in 20% or more and 15% or more, respectively, when the above amount of the compound of the formula (I) is incorporated into the contact lens. The reason for the above may be explained in accordance with the following hypothetical theory which should not be understood as limiting the present invention: polymerization reaction is carried out after the compound of the formula (I) according to the present invention is added to polymerizable monomers, so that the copolymerizability of the monomers is enhanced. More specifically, it is presumed that phase separation which tends to be caused due to the difference between the polymerizabilities of the monomers and the poor compatibility resulted from the difference between the polarities of the monomers is prevented by the presence of the compound (I). As a result, a uniform copolymer can be obtained. It is considered that since the copolymer obtained is uniform, a uniform contact lens excellent in optical properties and mechanical strength can be finally obtained from the copolymer.

Synthesis of Compound of Formula (I)

The compound of the formula (I) can be prepared, for example, by mixing a diazonium salt of a metallophthalocyanine group and polymerizable monomers, that is, (meth)acrylates, and polymerizing the mixture. More specifically, a metallophthalocyanine is subjected to nitration to obtain a nitrometallophthalocyanine, which is then reduced to an aminometallophthalocyanine. Subsequently, the aminometallophthalocyanine is subjected to diazotization, and the resulting diazo compound is decomposed in the presence of polymerizable monomers to give nitrogen radical of the metallophthalocyanine. Since the nitrogen radical acts as a polymerization initiator, the polymerizable monomers cause chain reaction, starting from the metallophthalocyanine, whereby a poly(meth)acrylate-combined metallophthalocyanine compound in which the metallophthalocyanine group and the (meth)acrylate copolymer are combined with each other can be obtained.

The specific conditions such as temperature and solvent under which the above series of reactions is carried out may be determined in accordance with the description by, for example, Horiguchi, "Colour Material (Shiki-zai)," Vol. 38, No. 3 (1964), pp. 100–108.

Further, it is also possible to utilize as the compound of the formula (I) a commercially available dye. Specific examples of such a dye include "Seikagen-O-Blue BKH1416" manufactured by Dainichiseika Color & Chemicals Mfg. Co., Ltd.

Colored Contact Lens and Production of the Same

The colored contact lens according to the present invention can be prepared with any polymer compound which has been conventionally used for producing contact lenses, except that the compound of the formula (I) is incorporated into the polymer.

A polymer obtained by polymerizing one or more of the following polymerizable monomers can be used as a main component of the contact lens. Examples of the polymerizable monomer which can be used as the starting material for the contact lens include radically-polymerizable compounds which are commonly used, i.e., those compounds which contain one or more vinyl, allyl or (meth)acryl groups in a molecule thereof. Specific examples of the polymerizable monomer preferably include (meth)acrylates such as alkyl (meth)acrylate, siloxanyl (meth)acrylate, fluoroalkyl (meth) acrylate, hydroxyalkyl (meth)acrylate, polyethylene glycol (meth)acrylate, (meth)acrylate of a polyhydric alcohol and vinyl (meth)acrylate, styrene derivatives, and vinyl compounds such as N-vinyl lactam and (polyvalent) vinyl carboxylate. More preferable examples of the polymerizable monomer include styrene, (meth)acrylic acid, methyl (meth)acrylate, ethyl (meth)acrylate, n-butyl (meth)acrylate, phenyl (meth)acrylate, 2-hydroxyethyl (meth)acrylate, 2,3-dihydroxypropyl methacrylate, 2-ethylhexyl methacrylate, isobornyl methacrylate, benzyl methacrylate, 2-methacryloyloxyethyl succinic acid, fumaric acid and esters thereof, methacrylonitrile, N,N-dimethylacrylamide, and N-vinyl-2-pyrrolidone.

It is particularly preferable to select, as a component of the contact lens of the present invention, a polymerizable monomer out of the (meth)acrylates among the above-described polymerizable monomers when the optical properties required for optical materials and safety required for medical materials are taken into consideration.

In recent years, materials having excellent oxygen permeability which can be made into both hard and soft contact lenses have been developed in order to alleviate the burden which tends to be imposed by conventional contact lenses upon eyes, and those contact lenses which are made from such materials are put on the market. Any of these materials can also be utilized for producing the colored contact lens of the present invention. Specific examples of the material which can be used in the present invention include a copolymer of a hydrophobic monomer such as a fluoroalkyl (meth)acrylate or siloxanyl (meth)acrylate and a hydrophilic monomer such as N,N-dimethyl acrylamide.

Specific examples of the above fluoroalkyl (meth)acrylate include compounds represented by the following formula (II), which have not only oxygen permeability but also resistance to stain which is one of the properties required for contact lenses:

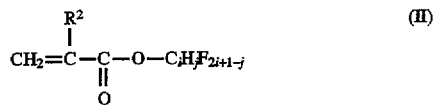

wherein $R^2$ represents a hydrogen atom or a methyl group, and

—$C_iH_jF_{2i+1-j}$ represents a linear or branched fluorine-containing group, in which i is an integer of 1 to 18, and j is an integer of 1 to 2i.

Specific examples of the fluoroalkyl (meth)acrylate represented by the general formula (II) include 2,2,2-trifluoroethyl(meth)acrylate, 2,2,2-trifluoro-1-trifluoromethylethyl (meth)acrylate, 3,3,4,4,5,5,5-heptafluoropentyl (meth)acrylate, 3,3,4,4,5,5,6,6,6-nonafluorohexyl (meth)acrylate, 3,3,4,4,5,5,6,6,7,7,8,8,8-tridecafluorooctyl (meth)acrylate, 3,3,4,4,5,5,6,6,7,7,8,8,9,9,10,10,10-heptadecafluorodecyl (meth)acrylate, 1,1,2,2-tetrahydroperfluorooctadecyl (meth)acrylate, 2,2,3,3-tetrafluoropropyl (meth)acrylate, 2,2,3,3,4,4,5,5,6,6,7,7,8,8,9,9-hexadecafluorononyl (meth)acrylate, 2,2,3,3,4,4,5,5,6,6,7,7,8,8,9,9,10,10,11,11-eicosafluoroundecyl (meth)acrylate.

The above siloxanyl (meth)acrylate is considered to be an important component like the fluoroalkyl (meth)acrylate so as to impart high oxygen permeability to contact lenses. Specifically, the siloxanyl(meth)acrylate is a compound represented by the following formula (III):

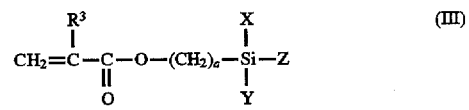

wherein $R^3$ is a hydrogen atom or a methyl group,

X and Y represent independently an alkyl group having 1 to 5 carbon atoms, a phenyl group, or Z, and Z is a group represented by the following group (IV):

in which, B represents an alkyl group having 1 to 5 carbon atoms or a phenyl group, and b is an integer of 0 to 5, and a is an integer of 1 to 3.

Specific examples of the siloxanyl (meth)acrylate represented by the general formula (III) include trimethylsilylmethyl (meth)acrylate, pentamethyldisiloxanylmethyl (meth) acrylate, methylbis(trimethylsiloxy)silylmethyl (meth) acrylate, tris(trimethylsiloxy)silylmethyl (meth)acrylate, bis (trimethylsiloxy)(pentamethyldisiloxanyloxy)silylmethyl (meth)acrylate, trimethylsiloxybis (pentamethyldisiloxanyloxy)silylmethyl (meth)acrylate, tris (pentamethyldisiloxanyloxy)silylmethyl (meth)acrylate, trimethylsilylethyl (meth)acrylate, pentamethyldisiloxanylethyl (meth)acrylate, methylbis (trimethylsiloxy)silylethyl (meth)acrylate, tris (trimethylsiloxy)silylethyl (meth)acrylate, bis (trimethylsiloxy)(pentamethyldisiloxanyloxy)silylethyl (meth)acrylate, trimethylsiloxy bis (pentamethyldisiloxanyloxy)silylethyl (meth)acrylate, tris (pentamethyldisiloxanyloxy)silylethyl (meth)acrylate, trimethylsilylpropyl (meth)acrylate, pentamethyldisiloxanylpropyl (meth)acrylate, methylbis (trimethylsiloxy)silylpropyl (meth)acrylate, tris (trimethylsiloxy)silylpropyl (meth)acrylate, bis (trimethylsiloxy)(pentamethyldisiloxanyloxy)silylpropyl (meth)acrylate, trimethylsiloxybis(pentamethyldisiloxanyloxy)silylpropyl (meth)acrylate, tris(pentamethyldisiloxanyloxy)silylpropyl (meth)acrylate, 1,3-bis(meth)acryloyloxyethyl-1,1,3,3-tetramethyl disiloxane, and 1,3-bis(meth)acryloyloxypropyl-1,1,3,3-tetramethyl disiloxane.

Further, according to a preferred embodiment of the present invention, the colored contact lens may be made from a polymer which is obtained by polymerizing the above polymerizable monomer together with a crosslinking agent. Preferable examples of the crosslinking agent include polyfunctional monomers such as ethylene glycol di(meth)acrylate, diethylene glycol di(meth)acrylate, triethylene glycol di(meth)acrylate, propylene glycol di(meth)acrylate, trimethylolpropane tri(meth)acrylate, pentaerythritol (meth)acrylate, 1,4-butanediol di(meth)acrylate, 1,6-hexanediol di(meth)acrylate, glycerol di(meth)acrylate, divinylbenzene diallyl phthalate and diethylene glycol bisallyl carbonate.

According to the preferred embodiment of the present invention, additives which are usually used in contact lenses, such as an ultraviolet-absorbing agent, can also be added.

The colored contact lens according to the present invention may be produced by any conventional process for producing contact lenses except that the above compound of the formula (I) is used to color the lens. The polymerization method and conditions, and the type and amount of a polymerization initiator to be used may be properly selected with consideration for the properties of a polymerizable monomer to be used, i.e., the viscosity and volume shrinkage of the monomer, the rate of polymerization, and the like.

The following three methods can be mentioned as typical methods for producing ordinary contact lenses: that is, the lathe cutting method (cutting and polishing method), the molding method (casting method), and the spin-casting method (centrifugal-casting method). The colored contact lens according to the present invention can be preferably produced by any one of these methods.

The lathe cutting method is presently the most common method for producing contact lenses, in which a material for a contact lens in the shape of a rod or a button is cut by a lathe, and then subjected to machining and polishing to obtain a contact lens.

The molding method and the spin-casting method are methods which are usually employed for producing soft contact lenses. The molding method is a method in which a polymerizable monomer is charged in a mold having a lens-shaped cavity, and then polymerized to obtain a contact lens. The spin-casting method is a method in which a polymerizable monomer is poured into a rotary mold and the mold is rotated to form a thin layer of the starting material by utilizing centrifugal force, thereby obtaining a contact lens.

In the case where the colored contact lens according to the present invention is produced by the lathe cutting method, it is necessary to firstly make the material for the contact lens into the shape of a rod or a button. Specifically, the material in such a shape can be obtained by pouring a polymerizable monomer, in which the compound of the formula (I) has been dispersed and dissolved, into a glass-, polypropylene- or polytetrafuluoroethylene-made polymerization tube or a sheet-shaped cavity, and polymerizing the polymerizable monomer, in general, in the presence of a polymerization initiator by applying heat or active energy rays such as ultraviolet rays. When polymerization distortion is caused in the polymer due to, for example, polymerization shrinkage or heat of polymerization, it is preferable to subject the polymer to heat-annealing so as to eliminate the distortion.

The polymerization initiator which is used in the above polymerization reaction is preferably a radical initiator. Specific examples of the radical initiator include benzoyl peroxide, diisopropyl peroxydicarbonate, t-butylperoxy-2-ethylhexanoate, t-butylperoxypivalate, t-butylperoxydiisobutyrate, t-butylperoxyisopropyl carbonate, lauroyl peroxide, azobisisobutyronitrile, and azobis(2,4-dimethylvaleronitrile). Further, in the case where the polymerization is conducted by applying active energy rays, a photopolymerization initiator such as benzoin ether, and, when necessary, a sensitizer are used. The amount of such an initiator is preferably from 0.001 to 2% by weight of the monomer used.

The thus-obtained material in a rod is cut into the shape of a contact lens and polished by the lathe cutting method to obtain a colored contact lens in a dry sate. Subsequently, the contact lens in a dry state is soaked in water or physiological saline, and allowed to swell. A colored soft contact lens can thus be obtained.

In the case where the molding method is employed, it is preferable to produce a colored soft contact lens in the following procedure: a polymerizable monomer in which the compound of the formula (I) has been dispersed and dissolved is poured into a mold which is commonly used as a resin mold in the production of a contact lens, and heat or active energy rays such as ultraviolet rays are then applied to the monomer to conduct thermal polymerization or photopolymerization. In the present invention, the following two methods are preferred: one is a method in which a contact lens is produced by polymerizing a polymerizable monomer poured into a cavity which is formed between a male mold and a female mold combined therewith; and the other is a method in which after a polymerizable monomer poured into a cavity formed between a male mold and a female mold combined therewith is polymerized, the male mold is fixed to a lens-cutting lathe with the female mold remained as it is or separated from the male mold, and the FC side of the lens is subjected to a cutting operation to produce a contact lens. (In this context, FC, front curve, is the surface of a contact lens opposite to the surface which is brought into contact with the cornea, or the curvature of such a surface; in contrast, the surface of a contact lens which is brought into contact with the cornea, or the curvature of such a surface is referred to as BC, base curve.) In particular, the latter method is also referred to as the blank-molding method, which is characterized by having both the advantage of the molding method in that contact lenses can be uniformly and inexpensively produced and the advantage of the lathe cutting method in that various types of contact lenses can be produced. For this reason, when this method is combined with the coloring technique using the compound of the formula (I) of the present invention, colored soft contact lenses of high quality can be produced more efficiently. Such a combination is thus preferred.

Specifically, a required amount of the polymerizable monomer containing the coloring component is put on the concave surface of the female mold, and the male mold is placed on the female mold so that the convex surface of the male mold and the concave surface of the female mold can fit together. Thereafter, heat or ultraviolet rays are applied to the monomer to conduct thermal polymerization or photopolymerization, thereby obtaining a molded product in the shape of a contact lens. When polymerization distortion is caused in the polymer due to polymerization shrinkage or heat of polymerization, the polymer may be subjected to heat-annealing so as to eliminate the distortion. When the molded product is made into a contact lens by cutting the FC side of the molded product, the male mold is fixed, after hardening is conducted, to a lens-cutting lathe through an attachment with the female mold remained as it is or separated from the male mold, and the FC side of the molded product is subjected to a cutting operation to obtain a colored contact lens in a dry state.

The thus-obtained contact lens in a dry state is soaked in water or physiological saline, and allowed to swell. A colored soft contact lens can thus be finally obtained. In this case, it is preferable to directly soak the contact lens in a dry state, which is still adhered to the resin mold for producing a contact lens, in water or physiological saline so as to simultaneously conduct the separation of the contact lens from the resin mold and the swelling of the contact lens. Such a procedure can simplify the process, and a colored soft contact lens can be efficiently produced.

In general, a certain amount of an unreacted monomer is remaining in the soft contact lens obtained by the above method. It is therefore preferable to remove the unreacted monomer by soaking the contact lens in water or physiological saline, and heating it.

The present invention will now be explained more specifically by referring to the following examples. However, the present invention is not limited to or limited by the examples.

EXAMPLE 1

A mixture of 70 parts by weight of N-vinyl-2-pyrrolidone, 29 parts by weight of methyl methacrylate, 0.5 parts by weight of tetraethylene glycol dimethacrylate, 0.02 parts by weight of poly(meth)acrylate-combined copper phthalocyanine (number-average molecular weight: approximately 50,000, monomeric composition of the polymer moiety: methyl methacrylate; 10 parts by weight, butyl methacrylate; 10 parts by weight, and 2-hydroxyethyl methacrylate; 3 parts by weight) and 0.1 parts by weight of azobis(2,4-dimethyl-valeronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 100° C. for 5 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 120 minutes to remove unreacted monomers. The resulting soft contact lens was uniformly colored with blue, and the water content thereof was found to be 70%.

The following tests were carried out to confirm the fastness of the soft contact lens obtained.

(1) Test for Fastness to Light:

A 0.9% physiological saline solution and a piece of the colored soft contact lens were placed in a transparent glass-made vial (internal volume: 10 cc). The vial was put in a fadeometer, "FAL-25AX" manufactured by Suga Test Instruments Co., Ltd., and the lens was exposed to light for 100 hours.

Color fading in the lens caused by the treatment was evaluated in the following manner. In this context, the term "color fading" as used herein means a decrease in the color density of a lens caused due to the elution of or a change in the molecular structure of a coloring material with which the lens is colored.

The color density of the contact lens was firstly measured. The compound of the formula (I) according to the present invention has a maximum absorption in the range of approximately 550 nm to 650 nm. It was therefore decided to evaluate the color density on the basis of 600 nm. Specifically, the visible-light transmittance of the lens (when the lens was a soft contact lens, it was in the state of being swollen with a 0.9% physiological saline solution) was measured by a spectrophotometer, "U3500" manufactured by Hitachi, Ltd. The difference (%) between the light transmittance at a wavelength of 800 nm and one at a wavelength of 600nm was taken as the color density. Color fading was evaluated by the difference (expressed in point) between the color densities of the lens before and after the test.

A color change caused in the lens was evaluated by visually comparing the color of the colored lens and that of the non-treated lens.

(2) Test for Fastness to Boiling:

A 0.9% physiological saline solution and a piece of the colored soft contact lens were placed in a transparent glass-made vial (internal volume: 10 cc). The vial was placed in an atmospheric constant temperature bath (100° C.), and continuously boiled for 200 hours by heating.

Color fading and a color change caused in the lens were evaluated in the same manner as in the above (1).

From the above fastness tests, the following results were obtained:

The results of the test for fastness to light (1) were as follows: the color density of the lens before the test was 4.2%, and that of the lens after the test was also 4.2%. Therefore, the score of the color fading caused in the lens was 0 point. Further, no color change was observed in the lens.

On the other hand, the results of the test for fastness to boiling (2) were as follows: the color density of the lens before the test was 4.2%, and that of the lens after the test was 4.0%. Therefore, the score of the color fading caused in the lens was only 0.2 points. Further, no color change was observed in the lens.

EXAMPLE 2

A mixture of 97 parts by weight of 2-hydroxyethyl methacrylate, 2 parts by weight of ethylene glycol dimethacrylate, 0.02 parts by weight of poly(meth)acrylate-combined copper phthalocyanine (number-average molecular weight: approximately 50,000, monomeric composition of the polymer moiety: methyl methacrylate; 10 parts by weight, butyl methacrylate; 10 parts by weight, 2-hydroxyethyl methacrylate; and 3 parts by weight) and 0.1 parts by weight of azobis(2,4-dimethylvaleronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 100° C. for 2 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 30 minutes to remove unreacted monomers.

The resulting soft contact lens was uniformly colored with blue, and the water content thereof was found to be 37%.

The lens was subjected to the same fastness tests as in Example 1. As a result, neither color fading (0 point) nor color change was observed in the lens in both the test for fastness to light and the test for fastness to boiling.

EXAMPLE 3

A mixture of 70 parts by weight of 2,3-dihydroxypropyl methacrylate, 28 parts by weight of methyl methacrylate, 1 part by weight of ethylene glycol dimethacrylate, 0.03 parts by weight of poly(meth)acrylate-combined chlorinated copper phthalocyanine (number-average molecular weight: approximately 40,000, monomeric composition of the polymer moiety: ethyl methacrylate; 15 parts by weight, butyl methacrylate; 5 parts by weight, and 2-hydroxyethyl methacrylate; 1 part by weight), and 0.05 parts by weight of azobis(2,4-dimethylvaleronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 100° C. for 2 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 30 minutes to remove unreacted monomers.

The resulting soft contact lens was uniformly colored with green, and the water content thereof was found to be 38%.

The lens was subjected to the same fastness tests as in Example 1. The results were as follows: the score of the color fading in the evaluation of fastness to light was only 0.1 points, and one in the evaluation of fastness to boiling was only 0.2 points. Further, no color change was observed in either test.

EXAMPLE 4

A mixture of 70 parts by weight of N-vinyl-2-pyrrolidone, 29 parts by weight of methyl methacrylate, 0.5 parts by weight of tetraethylene glycol dimethacrylate, 0.02 parts by weight of poly(meth)acrylate-combined brominated copper phthalocyanine (number-average molecular weight: approximately 50,000, monomeric composition of the polymer moiety: methyl methacrylate; 10 parts by weight, butyl methacrylate; 10 parts by weight, and 2-hydroxyethyl methacrylate; 3 parts by weight) and 0.1 parts by weight of azobis(2,4-dimethylvaleronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 100° C. for 5 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 120 minutes to remove unreacted monomers.

The resulting soft contact lens was uniformly colored with green, and the water content thereof was found to be 70%.

The lens was subjected to the same fastness tests as in Example 1. The results were as follows: the score of the color fading in the evaluation of fastness to light was only 0.1 points, and one in the evaluation of fastness to boiling was also only 0.1 points. Further, no color change was observed in either test.

EXAMPLE 5

A mixture of 70 parts by weight of N-vinyl-2-pyrrolidone, 29 parts by weight of methyl methacrylate, 0.5 parts by weight of tetraethylene glycol dimethacrylate, 0.03 parts by weight of poly(meth)acrylate-combined nickel phthalocyanine (number-average molecular weight: approximately 40,000, monomeric composition of the polymer moiety: ethyl methacrylate; 15 parts by weight, butyl methacrylate; 5 parts by weight, 2-hydroxyethyl methacrylate; 1 part by weight) and 0.1 parts by weight of azobis(2,4-dimethylvaleronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 100° C. for 5 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 120 minutes to remove unreacted monomers.

The resulting soft contact lens was uniformly colored with blue, and the water content thereof was found to be 70%.

The lens was subjected to the same fastness tests as in Example 1. The results were as follows: the score of the color fading in the evaluation of fastness to light was only 0.2 points, and one in the evaluation of fastness to boiling was only 0.3 points. Further, no color change was observed in either test.

EXAMPLE 6

A mixture of 60 parts by weight of 2,3-dihydroxypropyl methacrylate, 17 parts by weight of N,N-dimethyl acrylamide, 20 parts by weight of butyl methacrylate, 2 parts by weight of diethylene glycol dimethacrylate, 0.05 parts by weight of poly(meth)acrylate-combined copper phthalocyanine (number-average molecular weight: approximately 20,000, monomeric composition of the polymer moiety: butyl methacrylate; 10 parts by weight, 2-hydroxyethyl methacrylate; 1 parts by weight, and 2,3-dihydroxypropyl methacrylate; 1 part by weight) and 0.1 parts by weight of t-butylperoxy-2-ethylhexanoate was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 100° C. for 2 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 120 minutes to remove unreacted monomers.

The resulting soft contact lens was uniformly colored with blue, and the water content thereof was found to be 54%.

The lens was subjected to the same fastness tests as in Example 1. The results were as follows: the score of the color fading in the evaluation of fastness to light was only 0.2 points, and one in the evaluation of fastness to boiling was only 0.4 points. Further, no color change was observed in either test.

EXAMPLE 7

A mixture of 55 parts by weight of N,N-dimethylacrylamide, 15 parts by weight of tris (trimethylsiloxy)silylpropyl methacrylate, 25 parts by weight of 2,2,2-trifluoroethyl methacrylate, 3 parts by weight of 2-hydroxyethyl methacrylate, 1 part by weight of ethylene glycol dimethacrylate, 0.05 parts by weight of poly(meth)acrylate-combined copper phthalocyanine (number-average molecular weight: approximately 20,000, monomeric composition of the polymer moiety: butyl methacrylate; 10 parts by weight, 2-hydroxyethyl methacrylate; 1 parts by weight, and 2,3-dihydroxypropyl methacrylate; 1 part by weight) and 0.1 parts by weight of azobis(2,4-dimethylvaleronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 140° C. for 2 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 120 minutes to remove unreacted monomers.

The resulting soft contact lens was uniformly colored with blue, and the water content thereof was found to be 49%.

The lens was subjected to the same fastness tests as in Example 1. The results were as follows: the score of the color fading in the evaluation of fastness to light was only 0.1 points, and one in the evaluation of fastness to boiling was only 0.5 points. Further, no color change was observed in either test.

EXAMPLE 8

A mixture of 97 parts by weight of 2-hydroxyethyl methacrylate and 2 parts by weight of ethylene glycol dimethacrylate as polymerizable monomers, 0.02 parts by weight of poly(meth)acrylate-combined copper phthalocyanine (number-average molecular weight: approximately 40,000, monomeric composition of the polymer moiety: ethyl methacrylate; 15 parts by weight, butyl methacrylate; 5 parts by weight, 2-hydroxyethyl methacrylate; 1 part by weight) and 0.5 parts by weight of 2,4,6-trimethylbenzoyldiphenyl-phosphine oxide was thoroughly mixed, and the mixture was deaerated and replaced with nitrogen. Thereafter, the mixture was poured into a cavity formed between a male mold with a BC optical surface having a curvature of 7.21 mm and a female mold with an FC optical surface having a curvature of 7.70 mm. Ultraviolet rays were applied to the mixture for 200 seconds with an 80 W/cm high-pressure mercury vapor lamp which was placed at a distance of 15 cm, thereby polymerizing the mixture. The thus-obtained contact lens in a dry state was swollen with purified water, and then treated in purified water by boiling for 30 minutes to remove unreacted monomers.

The soft contact lens obtained had a BC of 8.60 mm and a power of −3.00D. The lens was uniformly colored with blue, and its water content was found to be 39%.

The lens was subjected to the same fastness tests as in Example 1. The results were as follows: the score of the color fading in the evaluation of fastness to light was 0 point, and one in the evaluation of fastness to boiling was only 0.2 points. Further, no color change was observed in either test.

EXAMPLE 9

A mixture of 70 parts by weight of N-vinyl-2-pyrrolidone, 29 parts by weight of methyl methacrylate and 0.5 parts by weight of tetraethylene glycol dimethacrylate as polymerizable monomers, 0.02 parts by weight of poly(meth) acrylate-combined copper phthalocyanine (number-average molecular weight: approximately 50,000, monomeric composition of the polymer moiety: methyl methacrylate; 10 parts by weight, butyl methacrylate; 10 parts by weight, and 2-hydroxyethyl methacrylate; 3 parts by weight) and 0.5 parts by weight of 2,4,6-trimethylbenzoyldiphenylphosphine oxide was thoroughly mixed, and the mixture was deaerated and replaced with nitrogen. Thereafter, the mixture was poured into a cavity formed between a male mold with a BC optical surface having a curvature of 5.53 mm and a female mold with an FC optical surface having a curvature of 6.28 mm. Ultraviolet rays were applied to the mixture for 600 seconds by using an 80 w/cm high-pressure mercury vapor lamp which was placed at a distance of 15 cm, thereby polymerizing the mixture. The thus-obtained contact lens in a dry state was swollen with purified water, and then treated in purified water by boiling for 120 minutes to remove unreacted monomers.

The soft contact lens obtained had a BC of 8.60 mm and a power of −3.00D. The lens was uniformly colored with blue, and its water content was found to be 72%.

The lens was subjected to the same fastness tests as in Example 1. The results were as follows: the score of the color fading in the evaluation of fastness to light was only 0.2 points, and one in the evaluation of fastness to boiling was only 0.4 points. Further, no color change was observed in either test.

EXAMPLE 10

A mixture of 70 parts by weight of 2,3-dihydroxypropyl methacrylate, 28 parts by weight of methyl methacrylate and 1 part by weight of ethylene glycol dimethacrylate as polymerizable monomers, 0.02 parts by weight of poly (meth)acrylate-combined copper phthalocyanine (number-average molecular weight: approximately 40,000, monomeric composition of the polymer moiety: ethyl methacrylate; 15 parts by weight, butyl methacrylate; 5 parts by weight, and 2-hydroxyethyl methacrylate; 1 part by weight) and 0.2 parts by weight of azobis(2,4-dimethylvaleronitrile) was thoroughly mixed, and the mixture was deaerated and replaced with nitrogen. Thereafter, the mixture was poured into a cavity formed between a male mold and a female mold to be used for the blank molding method, the curvature of the BC optical surface thereof being 7.25 mm. This was placed in a hot-air-circulating thermostatic chamber, and heated at 60° C. for 5 hours and at 90° C. for 3 hours. After the mixture was polymerized, the female mold was separated from the male mold. The male mold to which the semi-finished lens product was adhered was fixed to a lens-cutting lathe. The FC side of the lens was subjected to a cutting operation to make the curvature of the surface to 7.70 mm, and the FC surface was then polished. The thus-obtained contact lens in a dry state was soaked in purified water in order to swell the lens, and, at the same time, to separate the lens from the mold. The swollen lens was further treated in purified water by boiling for 120 minutes to remove unreacted monomers. The soft contact lens obtained had a BC of 8.60 mm and a power of −3.00D. The lens was uniformly colored with blue, and its water content was found to be 39%.

The lens was subjected to the same fastness tests as in Example 1. The results were as follows: the score of the color fading in the evaluation of fastness to light was 0 point, and one in the evaluation of fastness to boiling was only 0.2 points. Further, no color change was observed in either test.

Further, the above colored soft contact lens was subjected to the following strength test. Some pieces of the soft contact lens (thickness: 0.06 mm to 0.1 mm) swollen with physiological saline were used as specimens. In physiological saline, each specimen was supported at the top and bottom ends thereof, the distance between the two supports being 4 mm, and gradually stretched. The load (breaking strength) and the distance between the supports (elongation) at the time when the specimen was broken were measured. From the measured values obtained in this manner, an average breaking strength and an average elongation were obtained. It is noted that the breaking strength was expressed in the load per sectional area, $L(g/mm^2)$, and that the elongation, $E(\%)$, was expressed as $$E(\%) = \frac{(D2-D1)}{D1} \times 100$$

wherein D1 represents the distance of the supports before the specimen was stretched, and D2 represents the distance of the supports when the specimen was broken. As a result, L and E were 160 $g/mm^2$ and 143%, respectively.

EXAMPLE 11

A mixture of 58 parts by weight of N,N-dimethylacrylamide, 10 parts by weight of tris(trimethylsiloxy)silylpropyl methacrylate, 25 parts by weight of 2,2,2-trifluoroethyl methacrylate, 5 parts by weight of 2,3-dihydroxypropyl methacrylate and 1 part by weight of ethylene glycol dimethacrylate as polymerizable monomers, 0.02 parts by weight of poly(meth)acrylate-combined copper phthalocyanine (number-average molecular weight: approximately 20,000, monomeric composition of the polymer moiety: butyl methacrylate; 10 parts by weight, 2-hydroxyethyl methacrylate; 1 part by weight, and 2,3-dihydroxypropyl methacrylate; 1 part by weight) and 0.5 parts by weight of t-butylperoxypivalate was thoroughly mixed, and the mixture was deaerated and replaced with nitrogen. Thereafter, the mixture was poured into a cavity formed between a male mold and a female mold to be used for the blank molding method, the curvature of the BC optical surface thereof being 6.38 mm. This was placed in a hot-air-circulating thermostatic chamber, and heated at 70° C. for 5 hours and at 80° C. for 5 hours. Further, the male mold separated from the female mold was placed in a hot-air-circulating annealing oven, and heated at 130° C. for 5 hours. Thereafter, the male mold to which the semi-finished lens product was adhered was fixed to a lens-cutting lathe. The FC side of the lens was subjected to cutting to make the curvature of the surface to 6.90 mm, and the FC surface was then polished. The thus-obtained contact lens was soaked in purified water in order to swell the lens, and, at the same time, to separate the lens from the resin mold. The swollen lens was further treated by boiling in purified water for 120 minutes to remove unreacted monomers.

The soft contact lens obtained had a BC of 8.60 mm and a power of −3.00D. The lens was uniformly colored with blue, and its water content was found to be 50%.

The lens was subjected to the same fastness tests as in Example 1. The results were as follows: the score of the color fading in the evaluation of fastness to light was 0 point, and one in the evaluation of fastness to boiling was only 0.1 points. Further, no color change was observed in either test.

The contact lens was subjected to the same strength test as in Example 10. As a result, L and E were 226 $g/mm^2$ and 330%, respectively.

EXAMPLE 12

A mixture of 58 parts by weight of N,N-dimethylacrylamide, 10 parts by weight of tris(trimethylsiloxy)silylpropyl methacrylate, 25 parts by weight of 2,2,2-trifluoroethyl methacrylate, 5 parts by weight of 2,3-dihydroxypropyl methacrylate and 1 part by weight of ethylene glycol dimethacrylate as polymerizable monomers, 0.02 parts by weight of "Seikagen-O-Blue BKH-1416" manufactured by Dainichiseika Color & Chemicals Mfg. Co., Ltd., and 0.1 parts by weight of azobis(2,4-dimethylvaleronitrile) was thoroughly mixed, and the mixture was placed in a glass tube. The inside of the tube was repeatedly subjected to replacement with nitrogen and deaeration, and the tube was then sealed under vacuum. The sealed tube was heated at 30° C. for 5 hours, at 40° C. for 5 hours, at 50° C. for 5 hours, at 60° C. for 3 hours and at 70° C. for 3 hours in hot water, and at 140° C. for 2 hours in an atmospheric oven to conduct polymerization, thereby obtaining a polymer material in rod. The material in rod was cut in accordance with the lathe cutting method to obtain a contact lens in a dry state. The lens was soaked in purified water, and allowed to swell. Thereafter, the swollen lens was treated in purified water by boiling for 120 minutes to remove unreacted monomers. The resulting soft contact lens was uniformly colored with blue, and the water content thereof was found to be 50%.

The lens was subjected to the same fastness tests as in Example 1. The results were as follows: The score of the color fading was 0 point, and one in the test for fastness to boiling was 0.1 points. Further, no color change was observed in either test.

COMPARATIVE EXAMPLE 1

The procedure of Example 1 was repeated except that the poly(meth)acrylate-combined copper phthalocyanine used in Example 1 was replaced by 0.02 parts by weight of C. I. Solvent Green 3, thereby obtaining a colored soft contact lens. The soft contact lens thus obtained was uniformly colored with blue green, and its water content was found to be 70%.

The contact lens was subjected to the same fastness tests as in Example 1. As a result, color fading was clearly observed in the lens after the lens was continuously heated for 10 hours in the test for fastness to boiling. The color fading caused in the lens was evaluated in accordance with the manner described in Example 1. As a result, the color density of the lens, which was initially 4.5%, was decreased to 0.8% after the lens was heated for 10 hours. The score of the color fading was therefore 3.7 points. In addition, a color change was also observed in the lens after light was applied to the lens for 80 hours in the test for fastness to light.

COMPARATIVE EXAMPLE 2

The procedure of Example 11 was repeated except that the poly(meth)acrylate-combined copper phthalocyanine used in Example 11 was replaced by 0.05 parts by weight of C. I. Reactive Blue 28, thereby obtaining a contact lens in a dry state. In order to combine the coloring component with the material for the lens, the contact lens in a dry state was swollen with purified water, and then soaked in a 1% aqueous NaOH solution for 5 minutes. Thereafter, the lens was thoroughly rinsed with a large amount of water, and treated in purified water by boiling for 120 minutes to obtain a colored soft contact lens. The water content of the soft contact lens thus obtained was found to be 55%. The BC of the lens was 8.92 mm, which was not the desired value. The contact lens was subjected to the same strength test as in Example 10. As a result, L and E were 143 g/mm² and 260%, respectively. Furthermore, the colored soft contact lens was uniformly colored with blue. The lens was subjected to the same fastness tests as in Example 1. As a result, the color density of the lens, which was initially 5.1%, was decreased to 3.9% after the test. The score of the color fading was therefore 1.2 points.

COMPARATIVE EXAMPLE 3

The procedure of Example 10 was repeated except that the poly(meth)acrylate-combined copper phthalocyanine used in Example 10 was not added, thereby obtaining a soft contact lens swollen with water. The water content of the soft contact lens thus obtained was found to be 39%. The BC and the power of the lens were 8.60 mm and −3.00D, respectively. Thus, the contact lens obtained was in the desired shape.

The above lens was subjected to the strength test as in Example 10. As a result, L and E were 125 g/mm² and 115%, respectively.

COMPARATIVE EXAMPLE 4

The procedure of Example 11 was repeated except that the poly(meth)acrylate-combined copper phthalocyanine used in Example 11 was not added, thereby obtaining a soft contact lens swollen with water. The water content of the soft contact lens thus obtained was found to be 50%. The BC and the power of the lens were 8.60 mm and −3.00D, respectively. Thus, the contact lens obtained was in the desired shape. However, when the lens was subjected to the strength test as in Example 10, L and E were only 184 g/mm² and 305%, respectively.

What is claimed is:

1. A colored contact lens comprising a polymer as a main component of the contact lens and a poly(meth) acrylate-combined metallopthalocyanine compound represented by the following formula (I)

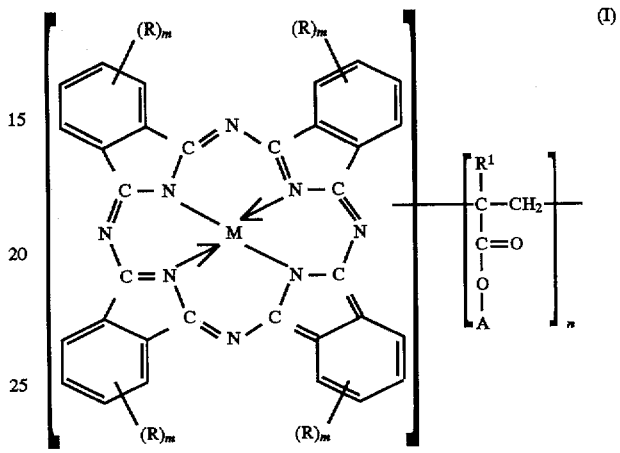

wherein

M represents a metal atom to which phthalocyanine can coordinate,

R represents a halogen atom or a bond with the poly (meth)acrylate moiety, m is an integer of 0 to 4, provided that one of Rs in the phthalocyanine group represents the bond with the poly(meth)acrylate moiety, $R^1$ represents a hydrogen atom or a methyl group, A represents a hydrogen atom, a $C_{1-12}$ alkyl group, a hydroxy$C_{1-12}$alkyl group or a glycerol group, and n is an integer sufficient to substantially prevent elution of the compound of formula (I) into the eye of the user.

2. The colored contact lens according to claim 1, wherein the polymer is a poly(meth)acrylate.

3. The colored contact lens according to claim 1, wherein the polymer is obtained by polymerizing monomers comprising N,N-dimethylacrylamide, a fluoroalkyl (meth) acrylate and a siloxanyl (meth)acrylate.

4. The colored contact lens according to claim 1 which is a soft contact lens having a water content of 45% or higher.

5. The colored contact lens according to claim 1, wherein M is copper.

6. The colored contact lens according to claim 1, wherein m is an integer of 1 to 4, and R represents chlorine or bromine.

7. The colored contact lens according to claim 1, wherein the poly(meth)acrylate-combined methallophthalocyanine compound represented by the formula (I) has a number-average molecular weight of 5,000 to 500,000.

8. The colored contact lens according to claim 1, wherein A is an alkyl group having 1 to 12 carbon atoms.

9. A process for producing a colored contact lens, comprising the steps of:

dispersing and dissolving the coloring agent according to claim 3 in a polymerizable monomer as a starting material for the contact lens to obtain a mixture, polymerizing the polymerizable monomer contained in the mixture to obtain a polymer, and processing the polymer into a contact lens.

10. A process for producing a colored contact lens, comprising the steps of:

a) dispersing and dissolving a poly(meth) acrylate-combined metallophthalocyanine compound in a polymerizable monomer as a starting material for the contact lens to obtain a mixture, said compound having a formula (I) as follows:

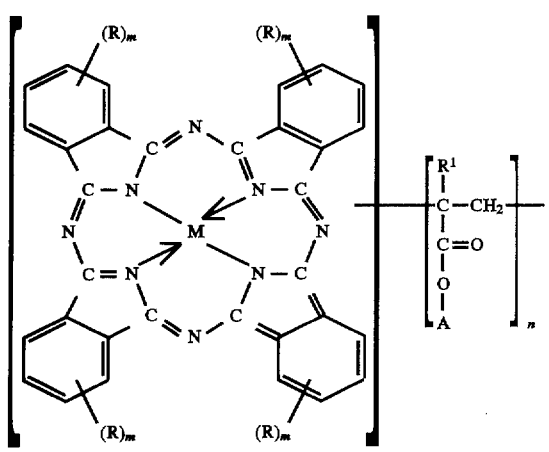

wherein

M represents a metal atom to which phthalocyanine can coordinate,

R represents a halogen atom or a bond with the poly (meth)acrylate moiety, m is an integer of 0 to 4, provided that one of Rs in the phthalocyanine group represents the bond with the poly(meth)acrylate moiety, $R^1$ represents a hydrogen atom or a methyl group, A represents a hydrogen atom, a $C_{1-12}$ alkyl group, a hydroxy$C_{1-12}$alkyl group or a glycerol group, and n is an integer sufficient to substantially prevent elution of the compound of formula (I) into the eye of the user, b) polymerizing the polymerizable monomer contained in the mixture to obtain a polymer, and c) processing the polymer into a contact lens.

11. In a process for producing a contact lens comprising the steps of a) polymerizing a polymerizable monomer to obtain a polymer; b) processing the polymer into a contact lens having a shape and curvature to fit over the cornea of an eye of a user; and c) soaking the contact lens in water or saline and allowing it to swell so as to form the contact lens with a water contact of at least 45%, said contact lens having a measurable average breaking strength and average elongation, the improvement comprising dispersing and dissolving with the polymerizable monomer in step (a) a poly(meth) acrylate-combined metallophthalocyanine compound represented by the following formula (I):

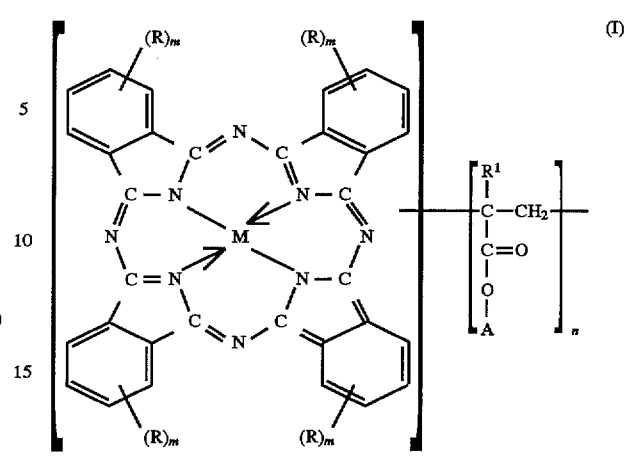

wherein

M represents a metal atom to which phthalocyanine can coordinate,

R represents a halogen atom or a bond with the poly (meth)acrylate moiety, m is an integer of 0 to 4, provided that one of Rs in the phthalocyanine group represents the bond with the poly(meth)acrylate moiety, $R^1$ represents a hydrogen atom or a methyl group, A represents a hydrogen atom, a $C_{1-12}$ alkyl group, a hydroxy$C_{1-12}$alkyl group or a glycerol group, and n is an integer sufficient to substantially prevent elution of the compound of formula (I) into the eye of the user, said compound of formula (I) being dispersed and dissolved in the polymerizable monomer in step (a) in an amount sufficient to form the contact lens with an improved average breaking strength and an improved average elongation and to impart color to the contact lens.

12. The process as claimed in claim 11, wherein the compound of formula (I) is dispersed and dissolved in the polymerizable monomer of step (a) in an amount sufficient to form the contact lens with an average breaking strength and an average elongation that is higher by at least 20% and 15% respectively as compared to the contact lens formed in step (c) without the compound of formula (I).

13. The contact lens obtained by the process of claim 11.

14. The contact lens of claim 13, wherein the compound (I) is present in an amount of about 0.001 to 2% by dry weight of the contact lens.

15. The contact lens of claim 14, wherein the contact lens has a thickness of between about 0.06 mm to 0.1 mm.

16. The colored contact lens obtained by the process according to claim 10.

17. The process for producing a colored contact lens according to claim 10, wherein the polymerizable monomer is a (meth)acrylate.

18. The process for producing a colored contact lens according to claim 10, wherein the polymerizable monomer comprises N,N-dimethylacrylamide, a fluoroalkyl (meth) acrylate and a siloxanyl (meth)acrylate.

* * * * *